(12) United States Patent
Haug

(10) Patent No.: US 8,162,088 B2
(45) Date of Patent: Apr. 24, 2012

(54) SPEED CONTROL DEVICE AND MOTOR VEHICLE HAVING SUCH A SPEED CONTROL DEVICE

(75) Inventor: Karsten Haug, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 656 days.

(21) Appl. No.: 12/226,180

(22) PCT Filed: Mar. 23, 2007

(86) PCT No.: PCT/EP2007/052832
§ 371 (c)(1),
(2), (4) Date: Apr. 14, 2009

(87) PCT Pub. No.: WO2007/118763
PCT Pub. Date: Oct. 25, 2007

(65) Prior Publication Data
US 2009/0321165 A1 Dec. 31, 2009

(30) Foreign Application Priority Data

Apr. 12, 2006 (DE) .......................... 10 2006 017 176

(51) Int. Cl.
*B60K 31/04* (2006.01)
(52) U.S. Cl. .......................................... 180/179; 701/70
(58) Field of Classification Search .................. 180/170, 180/171, 178, 179; 701/70
See application file for complete search history.

(56) References Cited

U.S. PATENT DOCUMENTS

| 4,470,396 | A | * | 9/1984 | Hasumi et al. | ................ 123/488 |
| 4,905,786 | A | * | 3/1990 | Miyake et al. | ................ 180/179 |
| 6,273,204 | B1 | * | 8/2001 | Winner et al. | ................ 180/170 |
| 6,792,344 | B2 | * | 9/2004 | Minowa et al. | ................ 701/96 |
| 2003/0225501 | A1 | * | 12/2003 | De La Salle et al. | ........... 701/93 |
| 2004/0129470 | A1 | * | 7/2004 | Huelser et al. | ................ 180/170 |
| 2004/0168843 | A1 | * | 9/2004 | Lankes et al. | ................ 180/178 |

FOREIGN PATENT DOCUMENTS

| DE | 197 19 458 | 11/1998 |
| DE | 101 43 735 | 9/2003 |
| EP | 1 619 067 | 1/2006 |
| JP | 2006-025489 | 1/2006 |
| JP | 2006-063959 | 3/2006 |

* cited by examiner

*Primary Examiner* — Frank Vanaman
(74) *Attorney, Agent, or Firm* — Kenyon & Kenyon LLP

(57) ABSTRACT

A speed control device for motor vehicles, having a controller and a user interface. A plurality of operating modes is implemented in the controller, which differ in their control strategies and include at least one eco mode, whose control strategy is optimized for a fuel-saving manner of driving. The user interface has an input device for selecting the operating mode. Use of the device is made advantageously in a hybrid vehicle. The control strategy may then be adapted to various parameters of the hybrid vehicle (charge state, power of the electric motor, scope of the regenerative braking).

6 Claims, 2 Drawing Sheets

SPEED CONTROL DEVICE AND MOTOR VEHICLE HAVING SUCH A SPEED CONTROL DEVICE

FIELD OF THE INVENTION

The present invention relates to a speed control device for motor vehicles, having a controller and a user interface, as well as to a motor vehicle having such a speed control device.

BACKGROUND INFORMATION

Within the scope of a vehicle speed controller, known speed control devices enable one to control the speed of one's own vehicle to a desired speed selected by the driver. Furthermore, advanced speed control devices are known, so-called ACC systems (adaptive cruise control), which are additionally in a position to find the position of a vehicle traveling ahead in one's own lane with the aid of a radar sensor or a comparable position-finding system, to measure its distance ahead and its relative speed, and then, by an intervention in the drive system and possibly also the braking system of one's own vehicle, to control the speed in such a way that the preceding vehicle is followed at an appropriately safe distance.

Within the scope of the speed control or distance control, if a setpoint/actual deviation occurs, a control strategy will be required which determines in which manner, and at which curve over time, the actual value should be brought back to the setpoint value. Parameters which determine this control strategy in a determinative way are, for example, the upper and the lower boundary values for the acceleration of one's own vehicle. The upper boundary value determines the maximum vehicle acceleration which is to be demanded of the drive system of the vehicle, within the scope of the control, and the (negative) lower boundary value determines the maximum deceleration at which the vehicle is to be decelerated. Other parameters may, for example, establish under what conditions an intervention in the braking system is to take place.

In the establishment of these parameters, various objectives should be considered which, in part, may be contradictory to one another. For one thing, of course, the necessary traffic safety should be ensured. In addition, a manner of travel should be achieved that is as comfortable as possible for the driver and the passengers, and which is also as fuel saving as possible. On the other hand, however, the flow of traffic should also not be impeded unnecessarily, and the system behavior should correspond to the greatest extent possible to the intuitive driving behavior of a human driver. If, for instance, a slower preceding vehicle is being followed on the passing lane of an expressway, and this vehicle then changes lanes to the right neighboring lane, one's own vehicle should then be accelerated again to the desired speed as quickly as possible, so that the passing procedure of one's own vehicle is shortened and the following traffic is not impeded. Up to this point, the establishment of the parameters determining the control strategy is based on a compromise between the various objectives.

SUMMARY OF THE INVENTION

It is an object of the present invention to provide a speed control device that permits a particularly fuel saving manner of driving.

This object is attained, according to the present invention, in that, in the controller, several operating modes are implemented which differ in their control strategies, and which include at least one eco mode whose control strategy is optimized for a fuel saving manner of driving, and in that the user interface has an input device for selecting the operating mode.

Under certain conditions, for instance, as a function of his current priorities or as a function of the traffic situation, this gives the driver the possibility of selecting a particularly fuel saving operating mode that will be designated below as the eco mode. In this operating mode, in general, the control strategy will be characterized by a low upper limit and a high lower limit for the acceleration.

The present invention is particularly advantageous in the case of motor vehicles that have hybrid drive.

In a hybrid drive, besides an internal combustion engine, an electric motor is provided to generate the propulsive power, which is fed by a rechargeable battery. In response to a deceleration of the vehicle, the electric motor may also be operated as a brake/generator, so that a part of the energy of motion is able to be recaptured and stored in the battery. An intelligent drive management provides that the internal combustion engine is operated as often as possible and as long as possible at its optimum operating point, at which it works at the highest efficiency. If the performance of the internal combustion engine is not sufficient in this state, the missing performance is provided by the electric drive, whereas reversely speaking, excess power is able to be used for recharging the battery. Because of this drive concept, fuel usage is clearly able to be reduced.

Now, the present invention permits the driver to select an eco mode in which the control strategy is matched optimally to the requirements of the hybrid drive. In this mode, for example, the upper boundary for the acceleration may be established in such a way that the required drive power is able to be provided by the electric drive, and consequently, the internal combustion engine does not have to leave its optimum operating point. Likewise, the lower boundary for the acceleration may be established in such a way that, in response to deceleration, energy of motion becoming free is able to be completely converted by the generator into electrical energy, so that no energy is lost by the activation of friction brakes.

In case of need, for instance, if, at a higher traffic density, a more dynamic manner of driving is indicated, so that changing lanes on multi-lane roadways may be undertaken without danger, the driver may switch over at any time to the "normal" operating mode, in which higher vehicle accelerations and decelerations are permitted.

It is true that in the eco mode, in the normal case, the upper acceleration limit will be reduced compared to the normal mode, but there may also be situations in which fuel savings will be achieved by permitting a greater acceleration than in the normal mode. In the case of a hybrid drive this is, for example, the case if the acceleration appropriate for the traffic situation is so great that the required additional power cannot be provided by the electric drive, so that the internal combustion engine has to work away from its optimum operating point. In this case, it may be expedient to increase the acceleration further, so that the vehicle attains its setpoint speed more rapidly, and the internal combustion engine returns again to its optimal operating point, correspondingly earlier.

When driving at approximately constant speed, under certain circumstances it may be expedient to vary the setpoint speed, especially to lower it, if thereby an unfavorable operating state, such as shifting down to a lower gear step, is avoidable. Conversely, in other situations fuel savings may be achieved by a slight increase in the setpoint speed, for instance, when it thereby makes possible shifting to a higher gear.

An increase in the setpoint speed beyond the desired speed selected by the driver is problematic, however, because the driver has possibly selected this desired speed to respect an existing speed restriction. If, for the purpose of fuel savings, it is required in the eco mode to increase the setpoint speed beyond the desired speed, the driver should receive a warning notice on this, or the increase should only be admissible if the driver confirms a query output by the system in this regard.

The parameters characterizing the control strategy, for example, the upper and the lower boundaries for the acceleration, may also vary as a function of the situation, for instance, as a function of the slope of the roadway, the payload of the vehicle and the like.

In general, the deviations of the acceleration boundaries and the setpoint speeds, that are valid in the eco mode, from the corresponding acceleration boundaries and setpoint speeds in normal operating mode should not exceed a certain measure, for example 10%, so that the vehicle's behavior remains determined for the driver, and no unexpected accelerations or decelerations occur.

In the eco mode matched to the hybrid drive, the control strategy may also be a function of the charge state of the battery. For instance, at a low charge state of the battery, the setpoint speed may be reduced, so that a certain excess power of the internal combustion engine is available for the recharging of the battery.

In known ACC systems, a so-called dip-in strategy is also a component of the control strategy, which determines, when approaching a slower preceding vehicle, how far one's own vehicle may "dip into" an appropriate safety distance. This dip-in strategy may also differ in the eco mode from that in the normal mode. Within the scope of the distance control, the setpoint distance is typically dependent on the speed, and it is determined by a time gap, selectable by the driver within certain limits, which gives the distance in time between the preceding vehicle and one's own vehicle. In the eco mode it may be expedient to enlarge this time gap, so that more play is available for the dip-in strategy.

In the case of vehicles having hybrid drive, a meaningful collaboration between the speed control device and the drive management should be striven for. This cooperation may expediently be designed so that the drive management makes the decisions on the selection of the drive source, the selection of the gear step and the like, and the speed control device always receives a status message from the drive management when it would be possible to achieve significant fuel savings by the modification of the setpoint acceleration and/or the setpoint speed.

DETAILED DESCRIPTION

Figure 1:
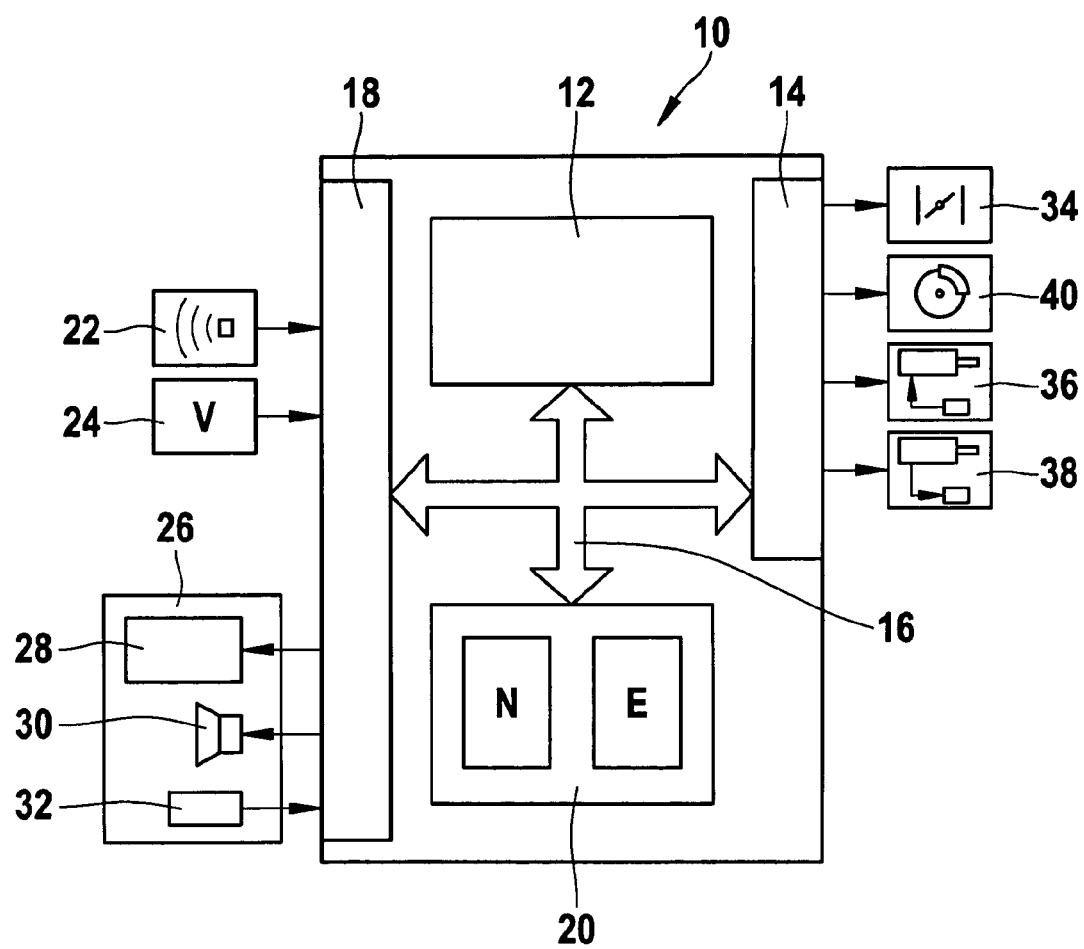
FIG. 1 shows a block diagram of a speed control device according to the present invention.

FIG. 1 shows as an example of a speed control device, according to the present invention, an ACC system for a vehicle having hybrid drive. An electronic control unit 10 includes a controller 12 for speed control and distance control, and a drive management system 14, which communicate with one another via a bus system 16, as well as with an interface unit 18 and a program and parameter memory 20.

Interface unit 18 receives position finding data for the distance control from a radar sensor 22, built into the vehicle, as well as a signal from a speed measurement unit 24 of the vehicle, which states the actual speed V of one's own vehicle. In addition, a user interface 26 is connected to interface unit 18, and it has a display 28 and an acoustical output device in the form of a loudspeaker 30, for outputting information to the driver. In addition, user interface 26 includes an input device 32, formed by one or more switches, via which the driver is able to input operating commands.

Drive management system 14 controls the hybrid drive of the vehicle, which includes an electromechanical converter which is able to operate both as an electric motor 36 and a generator 38. In the example shown, drive management system 14 also engages with brake system 40 of the vehicle. When a braking command is given by controller 12 or by the driver himself, drive management system 14 decides whether the necessary braking deceleration is able to be attained only with the aid of generator 38, or whether in addition, the usual braking system 40 of the vehicle, that is based on friction brakes, has to be activated.

With the aid of data supplied by radar sensor 22 and by speedometer 24, as well as possibly with the aid of certain additional information on the state of the vehicle, for instance, the yaw rate, controller 12, in a known manner, calculates a setpoint acceleration a, which forms the basis for the intervention in the drive system and/or the braking system of the vehicle. In the example shown here, this setpoint acceleration is passed on directly to drive management system 14, which then decides how the requested acceleration or deceleration is able to be attained in the most favorable consumption manner.

In program and parameter memory 20 parameter sets and possibly program modules are stored, which controller 12 accesses via bus system 16, and which specify different operating modes in which controller 12 is able to operate. One of these operating modes is a normal operating mode N, which corresponds to the usual function of an ACC system. The other operating mode is an eco mode E, which is optimized to as fuel consumption-favorable as possible a driving manner, while taking into consideration the properties of the hybrid drive (within certain limits). In particular, the parameter sets, stored in program and parameter memory 20, specify for each operating mode an upper limit a_max_N and a_max_E, as well as a lower limit a_min_N and a_min-E for setpoint acceleration a, which is able to be output to drive management 14. The lower limits are negative and consequently state the maximum deceleration of the vehicle that is admissible in each case.

Figure 2:
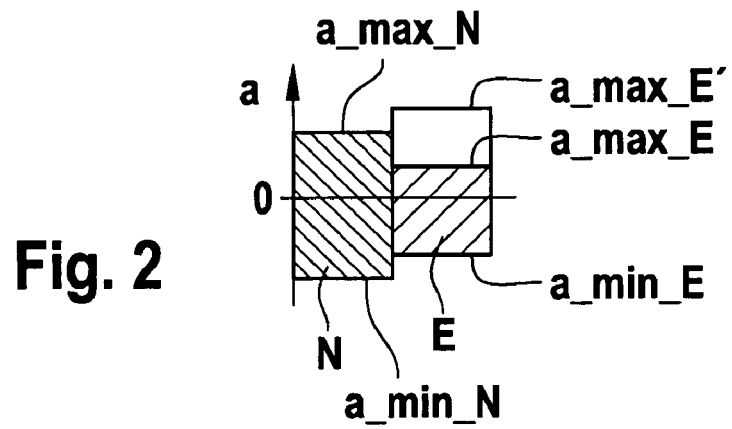
FIG. 2 shows a diagram to illustrate different control strategies.

As shown in FIG. 2, upper limit a_max_E for the acceleration in eco mode E is smaller than the corresponding upper limit in normal mode N, and lower limit a_min_E in eco mode E is greater than the corresponding lower limit in normal mode N. Consequently, in eco mode E the admissible acceleration range is more restricted, whereby a fuel-saving manner of driving is achieved. The limits in the eco mode are especially selected so that the corresponding acceleration or deceleration is able to be attained if possible with the aid of electric motor 36 or generator 38, without internal combustion engine 34 having to leave its optimum operating point.

However, under certain circumstances a greater upper limit a_max_E' may also apply in eco mode E for the acceleration, which is even higher than the upper limit in normal mode N. This is the case, for example, if the setpoint speed is substantially greater than the instantaneous actual speed, and therefore a "sensible" acceleration of the vehicle would have to be so great that the transmission would have to be shifted down by one gear and/or a greater performance would have to be required of internal combustion engine 34 than at its optimal operating point. In that case, the greater acceleration has the effect that the setpoint speed is attained more rapidly, and thus the favorable fuel usage state lasts only a relatively short time, so that fuel savings come about overall.

Figure 3:
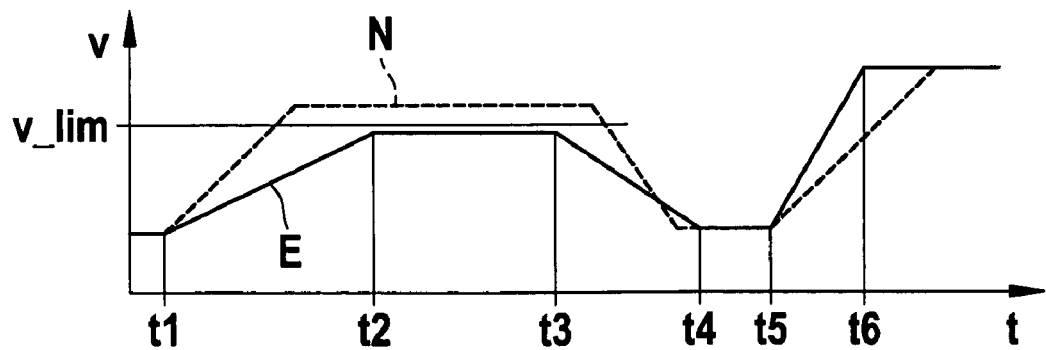
FIG. 3 shows a speed/time diagram for illustrating the effect of different control strategies.

FIG. 3 illustrates the system behavior with the aid of a speed/time diagram. The dashed curve marked N shows the speed curve in normal operating mode N, while the line that is plotted in a continuous line and denoted by E gives the corresponding speed curve in eco mode E.

Between times t1 and t2 the acceleration in eco mode E is smaller than in normal mode N, so that the acceleration phase lasts correspondingly longer. v_lim denotes a limiting speed which under the current operating conditions requires switching the drive system into another operating state. At a speed barely above v_lim, the fuel usage would be significantly higher than at a speed barely below this boundary value. For this reason, it is provided on eco mode E that between times t2 and t3 the setpoint speed, deviating from the desired speed selected by the driver, is reduced to a value below v_lim, so that one may take advantage of the fuel savings. Naturally, this applies only in the cases in which the desired speed selected by the driver is only slightly above v_lim.

At time t3, radar sensor 22, whose position-finding depth is, for example, 150 m, finds the position of a slower preceding vehicle. In eco mode E, the deceleration of the vehicle then sets in without delay, but at a relatively low deceleration rate. In normal mode N, by contrast, one pulls up closer to the preceding vehicle before the deceleration begins, but then at a greater deceleration rate. In the example shown, the new setpoint speed, which corresponds to the speed of the preceding vehicle, is reached in eco mode E only at time t4, whereas in normal mode N it would already be reached at an earlier point in time. This means that in eco mode E a slight and temporary falling below of the setpoint distance from the preceding vehicle is permitted earlier than in normal mode N.

At time t5 the preceding vehicle has changed to a side lane, so that the roadway is free again. Besides that, the driver has meanwhile clearly increased the desired speed. In this case, the acceleration rate in eco mode E corresponds to the increased upper limit a_max_E' in FIG. 2, so that the new desired speed is reached already at time t6, while in normal mode N the acceleration phase would be prolonged.

Controller 12 is preferably configured in such a way that it works in response to the activation of the ACC system in eco mode E. However, the driver is able to switch over at any time to normal mode N, and switch back again to eco mode E via operating device 32.

What is claimed is:

1. A speed control device for a motor vehicle, comprising:
a controller having a plurality of operating modes, which differ in their control strategies and include at least one eco mode, whose control strategy is optimized for a fuel-saving manner of driving; and
a user interface having an input device for selecting an operating mode;
wherein:
the controller computes a setpoint acceleration of the vehicle within a value range of admissible setpoint accelerations, and the value ranges differ for different operating modes;
each value range includes an upper limit and a lower limit for the setpoint acceleration;
an upper limit of a normal mode is higher than a first upper limit of the eco mode;
a lower limit of the normal mode is lower than a lower limit of the eco mode; and
the eco mode includes a second upper limit that is higher than the upper limit of the normal mode, the second upper limit temporarily replacing the first upper limit when it is determined that fuel savings can be achieved using a higher acceleration than would be used in the normal mode.

2. The speed control device according to claim 1, wherein limits of the value range in an eco mode differ by at most 10% from corresponding limits of the value range in the other operating modes.

3. The speed control device according to claim 1, wherein the vehicle has a hybrid drive, and a control strategy in an eco mode is a function of at least one of (a) an operating state and (b) a power capacity of drive aggregates and braking aggregates of the hybrid drive.

4. The speed control device according to claim 3, wherein the controller is adapted in the eco mode to regulate to a setpoint speed, as a function of the operating state of the hybrid drive, which deviates from a desired speed selected by a driver of the vehicle.

5. The speed control device according to claim 4, wherein the setpoint speed in the eco mode differs by at most 10% from a setpoint speed in the other operating modes.

6. A motor vehicle having a hybrid drive comprising a speed control device, the speed control device including:
a controller having a plurality of operating modes, which differ in their control strategies and include at least one eco mode, whose control strategy is optimized for a fuel-saving manner of driving; and
a user interface having an input device for selecting an operating mode;
wherein:
the controller computes a setpoint acceleration of the vehicle within a value range of admissible setpoint accelerations, and the value ranges differ for different operating modes;
each value range includes an upper limit and a lower limit for the setpoint acceleration;
an upper limit of a normal mode is higher than a first upper limit of the eco mode;
a lower limit of the normal mode is lower than a lower limit of the eco mode; and
the eco mode includes a second upper limit that is higher than the upper limit of the normal mode, the second upper limit temporarily replacing the first upper limit when it is determined that fuel savings can be achieved using a higher acceleration than would be used in the normal mode.

* * * * *